(12) United States Patent
Rojas et al.

(10) Patent No.: US 11,124,686 B2
(45) Date of Patent: Sep. 21, 2021

(54) DRILLING FLUIDS AND METHODS OF USE

(71) Applicant: ChampionX USA Inc., Sugar Land, TX (US)

(72) Inventors: Mario Roberto Rojas, Katy, TX (US); Vittoria Balsamo de Hernandez, Katy, TX (US)

(73) Assignee: ChampionX USA Inc., Sugar Land, TX (US)

( * ) Notice: Subject to any disclaimer, the term of this patent is extended or adjusted under 35 U.S.C. 154(b) by 72 days.

(21) Appl. No.: 15/177,808

(22) Filed: Jun. 9, 2016

(65) Prior Publication Data
US 2016/0362594 A1 Dec. 15, 2016

Related U.S. Application Data

(60) Provisional application No. 62/174,300, filed on Jun. 11, 2015.

(51) Int. Cl.
*C09K 8/12* (2006.01)
*C09K 8/516* (2006.01)
(Continued)

(52) U.S. Cl.
CPC .............. *C09K 8/12* (2013.01); *C04B 14/062* (2013.01); *C04B 20/1033* (2013.01); *C04B 24/287* (2013.01); *C04B 28/04* (2013.01); *C09K 8/46* (2013.01); *C09K 8/467* (2013.01); *C09K 8/487* (2013.01); *C09K 8/516* (2013.01); *E21B 21/003* (2013.01); *E21B 33/14* (2013.01); *C04B 2103/0051* (2013.01); *C04B 2103/465* (2013.01); *C04B 2111/00008* (2013.01);
(Continued)

(58) Field of Classification Search
CPC ...................................................... C09K 8/92
See application file for complete search history.

(56) References Cited

U.S. PATENT DOCUMENTS

| 4,172,066 A | 10/1979 | Zweigle et al. |
| 6,403,537 B1 * | 6/2002 | Chesser .................... C09K 8/12 507/120 |

(Continued)

FOREIGN PATENT DOCUMENTS

| CN | 102030873 B | 4/2011 |
| CN | 103725272 B | 4/2014 |

(Continued)

OTHER PUBLICATIONS

Chen et al. Hollow Core-Porous Shell Structure Polyacrylic acid nanogels, 2010.*

(Continued)

*Primary Examiner* — William D Hutton, Jr.
*Assistant Examiner* — Avi T Skaist
(74) *Attorney, Agent, or Firm* — Kagan Binder, PLLC (57) ABSTRACT

Drilling fluid compositions and methods of using them are described. The drilling fluid compositions comprise nanocomposites comprising core-shell morphology, wherein the core material comprises a nanoparticle having an average particle size of about 5 nm to 100 nm, and the shell material comprises a crosslinked polymer comprising acrylamide repeat units. The nanocomposites are effective fluid loss control agents when the drilling fluids are employed in mud drilling operations.

13 Claims, 5 Drawing Sheets

(51) Int. Cl.
*C09K 8/487* (2006.01)
*C09K 8/467* (2006.01)
*C04B 20/10* (2006.01)
*C04B 14/06* (2006.01)
*C04B 24/28* (2006.01)
*C04B 28/04* (2006.01)
*C09K 8/46* (2006.01)
*E21B 21/00* (2006.01)
*E21B 33/14* (2006.01)
*C04B 111/00* (2006.01)
*C04B 103/00* (2006.01)
*C04B 103/46* (2006.01)

(52) U.S. Cl.
CPC ...... *C09K 2208/10* (2013.01); *C09K 2208/18* (2013.01); *Y02W 30/91* (2015.05)

(56) References Cited

U.S. PATENT DOCUMENTS

| | | | |
|---|---|---|---|
| 7,993,749 | B2 | 8/2011 | Berkland et al. |
| 8,664,168 | B2 * | 3/2014 | Steiner .................. C09K 8/605 507/269 |
| 8,822,386 | B2 | 9/2014 | Quintero et al. |
| 2009/0236097 | A1 | 9/2009 | Roddy et al. |
| 2010/0096135 | A1 | 4/2010 | Roddy et al. |
| 2011/0118382 | A1 | 5/2011 | Reichenbach-Klinke et al. |
| 2012/0015852 | A1 * | 1/2012 | Quintero ................ C09K 8/032 507/112 |
| 2012/0073813 | A1 | 3/2012 | Zamora et al. |
| 2012/0190593 | A1 | 7/2012 | Soane et al. |
| 2013/0065798 | A1 * | 3/2013 | Amanullah .............. C09K 8/20 507/104 |
| 2014/0008067 | A1 * | 1/2014 | Roddy .................. B82Y 30/00 166/280.2 |
| 2014/0014348 | A1 * | 1/2014 | Mahoney ............... C09K 8/805 166/308.2 |
| 2014/0374095 | A1 * | 12/2014 | Ladva ..................... C09K 8/80 166/280.2 |
| 2015/0148269 | A1 | 5/2015 | Tamsilian et al. |

FOREIGN PATENT DOCUMENTS

| | | |
|---|---|---|
| WO | 2006072069 A2 | 7/2006 |
| WO | 2010011222 A1 | 1/2010 |

OTHER PUBLICATIONS

Bhardwaj, P. et al. "Polycacrylamide and poly(acrylamide-co-2-acrylamido-2-methyl-1-propanesulfonic acid)-silica composite nanogels through in situ microemulsion polymerisation," Journal of Material Science, 2010. 45. pp. 1008-1016.

International Search Report for International Application No. PCT/US2016/036624, dated Sep. 16, 2016, 5 pages.

Written Opinion for International Application No. PCT/US2016/036624, dated Sep. 16, 2016, 5 pages.

Extended European Search Report in Application No. 16808261.8, dated Feb. 7, 2019, 26 pages.

Mao et al. (2015) "Hydrophobic associated polymer based silica nanoparticles composite with core-shell structure as a filtrate reducer for drilling fluid at utra-high temperature", Journal of Petroleum Science and Engineering,129:1-14.

* cited by examiner

DRILLING FLUIDS AND METHODS OF USE

TECHNICAL FIELD

The invention is related to drilling fluid compositions including nanocomposites of polymers and organic or inorganic nanoparticles, and methods of drilling employing the drilling fluid compositions.

BACKGROUND

In geotechnical engineering, drilling fluids are used to aid the drilling of boreholes into the earth. Drilling fluids are often used while drilling oil and natural gas wells and on exploration drilling rigs, but are also useful in simpler operations such as drilling water wells. Liquid drilling fluid is often called drilling mud. The three main categories of drilling fluids are aqueous mud (which can be dispersed and non-dispersed), non-aqueous mud, usually called oil-based mud, and gaseous drilling fluid, in which a wide range of gases are used.

Aqueous muds typically include water, one or more clays, and various additives that are mixed to create a stable suspension. The clay is, for example, a combination of native clays that become suspended in the fluid during drilling, or a specific type of clay or clay mixture sold as an additive for aqueous mud systems. The most commonly employed type of clay in aqueous muds is bentonite. Many other chemicals are added to a waterbased mud system to achieve various effects, including viscosity control, shale stability, enhanced drilling rate of penetration, cooling, and lubrication.

The principal functions of drilling fluids include providing hydrostatic pressure to prevent formation fluids from entering into the well bore, keeping the drill bit cool and clean during drilling, carrying out drill cuttings, and suspending the drill cuttings while drilling is paused and when the drilling assembly is brought in and out of the hole. The drilling fluid used for a particular job is further selected to avoid formation damage and to limit corrosion.

Since a principal purpose of employing a drilling fluid is to provide hydrostatic pressure, it is critically important to prevent drying or draining of the fluid. The harsh environments encountered by the drilling fluid in high temperature/high pressure (HTHP) drilling operations exacerbate these problems. While water retention agents such as hygroscopic polymers (e.g. polyacrylamide or a polyacrylate salt) or montmorillonite clay are effective at fluid retention, such materials also swell appreciably in water, leading to rheological problems such as gelation or caking that in turn lead to inoperability of the drilling fluid.

Therefore, there is a need in the industry for methods of preventing fluid loss into the formation in aqueous muds, wherein the fluid loss control agent does not swell substantially in water. There is a need in the industry for methods of retaining water in aqueous muds wherein the temperature reaches or exceeds 80° C. to 200° C.

SUMMARY

Disclosed herein are drilling fluids comprising a water source; a bridging agent; and a nanocomposite comprising a core-shell morphology wherein the core comprises a nanoparticle having an average particle size of about 5 nm to 500 nm, and the shell comprises a crosslinked polymer comprising acrylamide repeat units. The nanocomposites are effective as barrier additives in the drilling fluids, where they act to enhance the packing of solids onto the surface of the rock to create a filter cake. The nanocomposites provide this barrier when mixed with water and a bridging agent such as calcium carbonate, but do not cause gelation or other rheological problems leading to inoperability of the drilling fluid. In some embodiments, the bridging agent is calcium carbonate. In some embodiments, the nanoparticle comprises silica, titania, alumina, or zirconia. In some embodiments, the polymer further comprises repeat units derived from acrylic acid or a salt thereof, 2-acryloylamino-2-methylpropane-1-sulfonic acid or a salt thereof, or a combination of two or more of these. In some embodiments, the crosslinker is N,N'-methylenebisacrylamide. In some embodiments, the weight ratio of nanoparticle to polymer is about 1:100 to about 50:50. In some embodiments, the nanocomposite is present at about 0.5 wt % to about 5 wt % of the fluid weight. In some embodiments, the nanocomposite comprises two or more nanocomposite sources, or two or more nanoparticulate sources, or both.

Also disclosed herein is a drilling fluid formed by the method comprising: forming a water-in-oil latex comprising an oil, a latex surfactant, water, a monomer, a crosslinker, and nanoparticles having an average particle size of about 5 nm to 500 nm; subjecting the latex to polymerization conditions to form a nanocomposite latex; optionally drying the nanocomposite latex to provide a nanocomposite; and adding a bridging agent and a water source to the nanocomposite or nanocomposite latex to form a drilling fluid.

Also disclosed herein is a method of mud drilling comprising: applying a drilling fluid to a wellbore of a hydrocarbon-bearing rock formation, the drilling fluid comprising a water source, a bridging agent, and a nanocomposite comprising a core-shell morphology wherein the core comprises a nanoparticle having an average particle size of about 10 nm to 100 nm, and the shell comprises a crosslinked polymer comprising acrylamide repeat units; and drilling within the wellbore. In some embodiments, a portion of the wellbore is about 80° C. to 200° C. In some embodiments, fluid loss within the wellbore in the presence of the drilling fluid corresponds to less than about 10 mL at 149° C. when measured according to API Recommended Procedure 13B-1.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

As used herein, the term "water source" means a source of water comprising, consisting essentially of, or consisting of fresh water, tap water, well water, deionized water, distilled water, produced water, municipal water, waste water such as runoff water, "gray" water, or municipal waste water, treated or partially treated waste water, brackish water, or sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof. In some embodiments, a water source includes about 0 wt % to 30 wt % total dissolved solids. The term "waterbased" or "water solution" generally refers to a composition including a water source. Generally and as determined by context, the term "water source" includes high total dissolved solids water sources, high temperature water sources, and high total dissolved solids, high temperature water sources.

As used herein, the term "high temperature" means about 80° C. to 200° C., as specified or determined by context.

As used herein, the term "high total dissolved solids" refers to a water source including at least about 4 wt % solids dissolved therein, and in embodiments up to about 30 wt % solids dissolved therein.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Additionally, where "about" is used to describe a range, "from about x to y" or "from x to about y" both mean the same as "from about x to about y" unless specifically stated otherwise; such ranges further include the range consisting of "from x to y".

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, flexibility, partition coefficient, solubility, temperature, viscosity, and the like; intended values include rate, thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

Described herein are drilling fluid compositions methods of using them. The drilling fluid compositions comprise nanocomposites comprising core-shell morphology wherein the core material comprises, consists essentially of, or consists of silica, modified silica, or another organic or inorganic nanoparticle having an average particle size of about 5 nm to 500 nm, and the shell comprises, consists essentially of, or consists of a crosslinked polymer comprising acrylamide repeat units. The composition of the crosslinked polymer comprising acrylamide repeat units is not particularly limited, but in some embodiments is a polyacrylamide copolymer. In some embodiments, the polymer is crosslinked. When employed as a component of a drilling fluid, the nanocomposites provide excellent fluid loss properties in mud drilling applications, decreasing the initial spur and the total filtrate volume in fluid loss tests. The nanocomposites are substantially free from swelling in water, thus do not cause gelation of the drilling fluid. The nanocomposites are thermally stable up to at least about 180° C., in some embodiments up to 250° C. and thus are suitable for contact with high temperature water sources encountered in some drilling operations. The nanocomposites are also useful in applications related to cement fluid loss control, water conformance in high permeability reservoirs (enhanced oil recovery), and diversion of flow in stimulation operations.

Nanocomposites

Nanocomposites useful in the drilling fluids of the invention are core-shell particles wherein the core comprises, consists essentially of, or consists of an inorganic or organic nanoparticulate having a particle size of about 5 nm to 500 nm and a shell comprising, consisting essentially of, or consisting of an organic water soluble polymer, or a crosslinked polymer that would be water soluble if not crosslinked. In embodiments, the particle size of the nanoparticulate is an average dimension in at least one direction. In some embodiments, the nanoparticle size is about 5 nm to 450 nm, or about 5 nm to 400 nm, or about 5 nm to 350 nm, or about 5 nm to 300 nm, or about 5 nm to 250 nm, or about 5 nm to 200 nm, or about 5 nm to 150 nm, or about 5 nm to 100 nm, or about 5 nm to 50 nm, or about 5 nm to 20 nm, or about 10 nm to 500 nm, or about 10 nm to 400 nm, or about 10 nm to 300 nm, or about 10 nm to 200 nm, or about 10 nm to 100 nm, or about 10 nm to 50 nm, or about 10 nm to 40 nm, or about 10 nm to 30 nm, or about 10 nm to 20 nm. In some embodiments, average particle size indicates average size of discrete particles, not agglomerates thereof. In other embodiments, the particle size indicates average size of particle agglomerates.

In some embodiments, a nanoparticle is a nanoparticle source, wherein two or more nanoparticle sources are employed in the synthesis. For example, in some embodiments, nanoparticles having an average particle size of about 10 nm to 20 nm are mixed with nanoparticles having an average particle size of 100 nm to 200 nm in a single synthesis of nanocomposites. Such blending is not limited in any way: various nanoparticle sources are advantageously blended in any ratio suitable to obtain a selected set of nanocomposite particle sizes. By using two or more nanoparticle sources, bimodal or higher order modes of nanocomposite particle average sizes are obtained. In some embodiments, the two or more nanoparticle sources comprise nanoparticles of varying composition. Such nanoparticle sources are blended to obtain a final product having two different nanocomposite compositions. In some embodiments, nanoparticle sources of different average particle size, different composition, or both are blended in a single synthesis to reach a targeted nanocomposite composition.

The nanoparticulates useful in the formation of the nanocomposites include colloidal particulates suspended in water and dry particulates. Examples of suitable inorganic nanoparticles include silica, treated or partially treated fumed silica, colloidal silica, or silica-alumina composite particles; alumina, titania, zirconia, or clay; carbon; and natural product based particulates such as lignite. Microporous and mesoporous particulates incorporating these chemistries are also useful in forming the nanocomposites. Any of these particulates are suitably employed with or without surface treatment thereof. Surface treatments are commonly employed to produce a more hydrophobic particulate surface; such particulates are termed hydrophobically modified. For example, silane coupling agents (general formula of $(RO)_3SiR'$, where R and R' are alkyl groups) are commonly employed to condense and/or bond to the surface of the particulate, thereby providing an alkyl group (R') on the particle surface to increase the hydrophobicity of the surface. In some embodiments, R' is a polymerizable group, such as an acrylate or acrylamide functional group. In such embodiments, subsequent polymerization leads to a polymer grafted to the nanoparticle.

Both untreated and surface treated nanoparticulates are advantageously used in the present invention. Similarly, other particulates are surface treated in some embodiments of the invention. Suitable silica particulates useful in forming nanocomposites include those sold by Evonik Industries AG of Essen, Germany under the trade names AEROSIL®, such as AEROSIL® 90 (fumed silica, particle size 12 nm, BET surface area 90 $m^2/g$) and AEROSIL® R-972 (hydrophobically modified silica, particle size 16 nm, BET surface area 110 $m^2/g$).

The size distribution of the nanoparticulates is not particularly limited except that it is desirable to exclude particulates having a substantial proportion of particles having a particle size over 300 nm, or even over 200 nm. Thus, in some embodiments a substantial fraction, such as about 50% to 100% of the particulates have a particle size of 200 nm or less, or about 60% to 100%, or about 70% to 100%, or about 80% to 100%, or about 90% to 100%, or about 95% to 100%, or about 98% to 100%, or about 99% to 100%, or about 100% of the particulates have a particle size of 200 nm or less. In some embodiments, particle size means the size of discrete particles; in other embodiments the particle size means the size of a particle agglomerate. Additionally, while the shape of the nanoparticles is not particularly limited, we have found that substantially spherical particulate materials are advantageous for fluid loss control in mud drilling applications. Other particulates that are fiber-like, irregular, or stacked plates (such as many clay materials) are also useful in the present nanocomposite syntheses and applications.

Nanocomposite synthesis is described in Bhardwaj et al., J. Mat. Sci. (2010) 45:1008-1016. The polymer shell is applied to the particulate core via in situ polymerization using a water-in-oil emulsion (w/o latex). During the synthesis, the particulates are suspended within the discontinuous water phase of the latex along with water soluble monomers; upon initiation of polymerization, the monomers are polymerized in the presence of the nanoparticle to form a discrete core-shell morphology having a narrow size distribution attributed to the narrow size range of the discontinuous water phase. The latex product that results does not precipitate, but in some embodiments the latex is precipitated and dried, and the solids are divided e.g. into a powder. We have found that commonly employed drying mechanisms such as spray drying of the latices lead to unagglomerated nanocomposite particles that upon resuspension in water form discrete, divided particulates having substantially the same size range as measured at the end of the synthesis and prior to drying the nanocomposite. In an alternative embodiment, the latex product is concentrated by evaporation of a portion of the oil phase, water phase, or both after polymerization is completed.

The synthesis of the nanocomposites employs combinations of one or more nanoparticulates and conventional w/o latex polymerization components: a water phase including one or more water soluble monomers, an oil phase including a non-aqueous solvent or oil, and at least one surfactant suitable to stabilize the water phase as a discontinuous phase within a continuous oil phase. Optionally, a water soluble crosslinker is included in the water phase. The nanoparticulate is added to the water phase or to the w/o latex prior to polymerization. After one or more nanoparticulates and conventional w/o latex polymerization components are combined, polymerization is initiated according to conventional inverse emulsion polymerization processes to result in the nanocomposites of the invention, residing substantially within the water phase of the w/o latex.

In embodiments, one or more monomers are present in the water phase at about 5 wt % to 50 wt % based on the total weight of the w/o latex, or about 5 wt % to 40 wt %, or about 5 wt % to 30 wt %, or about 5 wt % to 20 wt %, or about 10 wt % to 50 wt %, or about 15 wt % to 50 wt %, or about 20 wt % to 50 wt %, or about 25 wt % to 50 wt %, or about 30 wt % to 50 wt %, or about 35 wt % to 50 wt %, or about 40 wt % to 50 wt %, or about 20 wt % to 40 wt % based on the total weight of the w/o latex.

Nonlimiting examples of monomers employed in the synthesis of the shell portion of the nanocomposites include acrylamide, methacrylamide, N,N-dimethylacrylamide, N-isopropylacrylamide, acrylic acid and salts thereof, 2-acryloylamino-2-methylpropane-1-sulfonic acid (AMPS A), dimethylaminopropyl methacrylamide (DMAPMA), methacrylamido propyltrimethylammonium chloride (MAPTAC), N,N-dimethyl-N,N-diallyl ammonium chloride (DADMAC), [3-(acryloylamino)propyl]trimethyl ammonium chloride (APTAC), 2-acryloyloxyethyltrimethyl ammonium chloride (AETAC), 2-methacryloyloxyethyltrimethyl ammonium chloride (METAC), acryloyloxyethyldimethylbenzyl ammonium chloride (AEDBAC), methacryloyloxyethyldimethylbenzyl ammonium chloride (MEDBAC) and combinations thereof in any ratio. In some embodiments, the monomers comprise, consist essentially of or consist of acrylamide and acrylic acid; in some such embodiments, the mole ratio of acrylamide to acrylic acid is about 70:30. In some embodiments, the monomers comprise, consist essentially of or consist of acrylamide, acrylic acid, and AMPSA. In some embodiments, the monomers comprise, consist essentially of or consist of acrylamide and AMPSA. In some embodiments, the monomers comprise, consist essentially of or consist of acrylamide.

A water soluble crosslinker is included in the water phase. Useful crosslinkers include any water soluble compound having two or more unsaturated moieties that are reactive with free radical sources. For example, acrylate diesters of diols such as glycols, acrylate diesters, triesters, or higher functionality esters of polyols including sugar alcohols (e.g. glycerol, erythritol, sorbitol, and the like) and sugars, and bisacrylamide compounds such as N,N'-methylene bisacrylamide and are commonly employed in the industry and are useful as crosslinkers in the formation of the nanocomposites. Where present, the crosslinkers are employed in the w/o latex at about 1 wt % or less of the w/o latex, for example about 0.01 wt % to 1 wt %, or about 0.05 wt % to 1 wt %, or about 0.1 wt % to 1 wt %, or about 0.01 wt % to 0.5 wt %, or about 0.01 wt % to 0.4 wt %, or about 0.01 wt % to 0.3 wt %, or about 0.01 wt % to 0.2 wt %, or about 0.01 wt % to 0.1 wt %, or about 0.05 wt % to 0.5 wt %, or about 0.1 wt % to 0.3 wt % of the latex.

Also present in the w/o latex is an amount of water sufficient to form a water phase within the latex. Water is present in the w/o latex at about 30 wt % to 60 wt % based on the total weight of the w/o latex, or about 35 wt % to 60 wt %, or about 40 wt % to 60 wt %, or about 45 wt % to 60 wt %, or about 30 wt % to 55 wt %, or about 30 wt % to 50 wt %, or about 35 wt % to 50 wt %, or about 40 wt % to 50 wt % based on the total weight of the w/o latex. In some embodiments, the water is a water source.

Also present in the w/o latex is an amount of oil sufficient to form a continuous oil phase within the latex. In some embodiments, the oil is not flammable at temperatures less than about 90° C., or less than about 80° C., or less than about 70° C. In some embodiments, the oil is a mixture of compounds, wherein the mixture is less than 0.1 wt % soluble in water at 25° C. and is substantially a liquid over the range of 20° C. to 90° C. In some embodiments, the oil comprises, consists essentially of, or consists of one or more linear, branched, or cyclic hydrocarbon moieties, aryl or alkaryl moieties, or combinations of two or more such moieties. In some embodiments, the oil has a density of about 0.8 g/L to 1.0 g/L, for example about 0.8 g/L to 0.9 g/L. Examples of suitable oils include decane, dodecane, isotridecane, cyclohexane, toluene, xylene, naphtha, and mixed paraffin solvents. In embodiments, the oil is present in the w/o latex at about 20 wt % to 50 wt % based on the total weight of the w/o latex, or about 25 wt % to 50 wt %, or about 30 wt % to 50 wt %, or about 20 wt % to 45 wt %, or about 20 wt % to 40 wt %, or about 25 wt % to 45 wt %, or about 25 wt % to 40 wt %, or about 30 wt % to 40 wt % based on the total weight of the w/o latex.

Also present in the w/o latex is one or more latex surfactants. Latex surfactants are employed to form and stabilize the w/o latices during polymerization and to maintain stability until inversion. Conventionally employed surfactants for w/o latices include nonionic ethoxylated fatty acid esters, block copolymers of ethylene oxide and propylene oxide, ethoxylated sorbitan fatty acid esters, sorbitan esters of fatty acids such as sorbitan monolaurate, sorbitan monostearate, and sorbitan monooleate, block copolymers of ethylene oxide and hydroxyacids having a $C_{10}$-$C_{30}$ linear or branched hydrocarbon chain, and blends of two or more of these targeted to achieve a selected hydrophilic/lipophilic balance (HLB). Those of skill will understand that a plethora of surfactants are employed throughout the industry to form and stabilize w/o latices, serving as a medium for polymerization of monomers and further maintaining emulsion stability of the polymerized product formed therein until further processing or subsequent use in the field. Any nonionic surfactants and blends thereof conventionally employed in w/o latices are suitably employed in conjunction with the present invention. In embodiments, the latex surfactant is a single nonionic surfactant or blend thereof having a combined HLB value of about 4 to 11, for example about 5 to 11, or about 6 to 11, or about 5 to 9, or about 5 to 10, or about 6 to 10, or about 7 to 10. Suitable surfactants include sorbitan monooleate and Polysorbate 85 (sold by some sources under the trade names SPAN® 80 and TWEEN® 85, respectively), ethoxylated sorbitan fatty acid esters sold under various trade names as will be appreciated by one of skill.

In embodiments, the latex surfactants are present in the w/o latex at about 5 wt % to 15 wt % of the w/o latex, or about 6 wt % to 15 wt %, or about 7 wt % to 15 wt %, or about 8 wt % to 15 wt %, or about 9 wt % to 15 wt %, or about 10 wt % to 15 wt %, or about 5 wt % to 14 wt %, or about 5 wt % to 13 wt %, or about 5 wt % to 12 wt %, or about 5 wt % to 11 wt %, or about 5 wt % to 10 wt %, or about 5 wt % to 9 wt %, or about 5 wt % to 8 wt %, or about 5 wt % to 7 wt % of the w/o latex.

Representative amounts of the above listed materials are suitably included in one or more w/o latices, wherein the amounts are suitably selected to provide optimal kinetic stability of the latex. Representative amounts of these materials are shown below, wherein these amounts are intended to be representative of the w/o latices useful in conjunction with the methods and materials of the invention. Useful w/o latices are not limited to those shown below. Where amounts listed below do not add up to 100 wt %, one or more additional components are also present in the latex.

| | | Amount in a w/o Latex, wt % | | | |
|---|---|---|---|---|---|
| Phase | Material | Latex 1 | Latex 2 | Latex 3 | Latex 4 |
| Oil | Oil (solvent) | 20-30 | 25-30 | 20-25 | 30-40 |
| | Latex Surfactant | 10-15 | 5-7 | 5-10 | 7-12 |
| Water | Monomer (or Polymer) | 10-25 | 20-30 | 35-40 | 20-40 |
| | Water | 20-40 | 30-35 | 35-40 | 20-30 |

The w/o latices optionally include one or more additives. Salts, buffers, acids, bases, chain transfer agents, thermal stabilizers, metal chelators, coalescing solvents, and the like are optionally included in the w/o latices. In some embodiments, the additives include one or more corrosion inhibitors, scale inhibitors, emulsifiers, water clarifiers, hydrogen sulfide scavengers, gas hydrate inhibitors, biocides, pH modifiers, antioxidants, asphaltene inhibitors, or paraffin inhibitors. In some embodiments, the additives include one or more inverting surfactants, which are ionic or nonionic surfactants having an HLB of greater than about 10. While the amount of an additive usefully employed in the w/o latex depends on the additive and the intended application, in general the amount of any individual additive is about 0 wt % to 5 wt % based on the total weight of the w/o latex, or about 0 wt % to 4 wt %, or about 0 wt % to 3 wt %, or about 0 wt % to 2 wt %, or about 0. wt % to 1 wt % based on the total weight of the latex.

The nanoparticulate is added to the water phase prior to formation of the w/o latex, or is added to the w/o latex after the above components are assembled. The nanoparticulates are described above. These are added to the w/o latex at about 0.1 wt % to 10 wt % of the w/o latex, or about 0.2 wt % to 10 wt %, or about 0.3 wt % to 10 wt %, or about 0.4 wt % to 10 wt %, or about 0.5 wt % to 10 wt %, or about 1 wt % to 10 wt %, or about 2 wt % to 10 wt %, or about 3 wt % to 10 wt %, or about 4 wt % to 10 wt %, or about 0.1 wt % to 9 wt %, or about 0.1 wt % to 8 wt %, or about 0.1 wt % to 7 wt %, or about 0.1 wt % to 6 wt %, or about 0.1 wt % to 5 wt %, or about 0.1 wt % to 4 wt %, or about 0.1 wt % to 3 wt %, or about 0.1 wt % to 2 wt %, or about 0.1 wt % to 1 wt %, or about 0.5 wt % to 7 wt %, or about 0.5 wt % to 6 wt %, or about 0.5 wt % to 5 wt %, or about 1 wt % to 5 wt % of the w/o latex.

In embodiments, the w/o latices are made using conventional equipment and methodology. Thus, in embodiments a w/o latex containing the monomers and nanoparticulate is formed and the polymerization is initiated within the water phase of the latex. One of skill in the art will appreciate that the method of initiation, and the equipment and compounds employed to initiate polymerization are not particularly limited. A wide range of water soluble free-radical or redox type initiators will work to initiate the polymerization; water insoluble initiators such as azobisisobutyronitrile (AIBN) are also commonly employed to initiate polymerization in the water phase. Conventional methods of initiation including exclusion of air, heating, and stirring for a period of time to accomplish the polymerization are employed to polymerize the monomers present in the w/o latex and result in a nanocomposite latex composition.

After polymerization, the weight ratio of nanoparticle to polymer in the nanocomposite particles is about 1:100 to 50:50, for example about 2:98 to 50:50, or about 3:97 to 50:50, or about 4:97 to 50:50, or about 5:95 to 50:50, or about 1:100 to 40:60, or about 1:100 to 30:70, or about 1:100 to 20:80, or about 1:100 to 10:90, or about 1:100 to 5:95.

The nanoparticles act as a substrate for polymer growth during synthesis. The size of the water phase droplets within the continuous oil phase controls the size of the polymer shell as it forms around the particles. For purposes of providing a controlled, reproducible product, it is advantageous to provide uniform size distribution of a nanocomposite derived from a single nanoparticle source. In addition to efficient manufacturing, a more uniform nanocomposite enables predictability and optimization of particle packing when the nanocomposite is incorporated e.g. into drilling fluid, and thus dosing amounts of the nanoparticulate may be predicted in the field. Performance of the nanocomposites is repeatable and predictable in one or more mud drilling applications. Further, the ability to provide controlled bimodal or higher order mode size distributions, as described above, is easily accomplished by providing two or more nanocomposite average particle size distributions in a single synthesis.

In some embodiments, the average particle size of the nanocomposites is about the same as, or is less than, the particle size that arises when the corresponding polymer is synthesized under the same conditions but without the nanoparticulate. Thus, for example, in some embodiments an acrylamide homopolymer synthesized in a w/o latex in the absence of nanoparticulate has about the same average particle size after completion of polymerization than the same acrylamide polymer when synthesized under the same conditions but with a nanoparticle present. In some embodiments, an acrylamide homopolymer synthesized in a w/o latex in the absence of nanoparticulate (polymer particle) has a larger average particle size after completion of polymerization than the same acrylamide polymer when synthesized under the same conditions but with a nanoparticle present (nanocomposite particle), for example about 5% to 50% larger average particle size, or about 10% to 30% larger average particle size.

In some embodiments, it is possible to synthesize the nanocomposites using dispersion polymerization techniques. A dispersion polymerization in water is employed where it is desirable to avoid the use of oil, and further wherein it is desirable to reduce or eliminate the use of surfactants. The polymerization is carried out substantially in water, wherein the product of the polymerization is a nanocomposite dispersed in water, substantially free of oil and having a reduced surfactant level or being substantially free of surfactant.

The nanocomposites include one or more of the following properties, amounts, or dimensions. The nanocomposites are selected for one or more properties based on the properties, amounts, and dimensions of materials used in the synthesis thereof.

| Nanoparticle | Average Nanoparticle size | Nanoparticle:polymer ratio | Nanocomposite particle size |
| --- | --- | --- | --- |
| Silica | 5 nm-20 nm | 1:100 to 5:95 | 150 nm to 400 nm |
| Titania | 10 nm-100 nm | 1:20 to 1:5 | 100 nm to 300 nm |
| Zirconia | 20 nm-50 nm | 1:10 to 1:1 | 25 nm to 200 nm |
| Silica | 150 nm-300 nm | 10:90 to 30:70 | 160 nm-500 nm |

Applications

Cement Fluid Loss Control Compositions and Methods.

Cementing is a common technique employed during many phases of wellbore operations. For example, cement may be employed to isolate or secure various casing strings and/or liners in a well. In other cases, cementing may be used in remedial operations to repair casing and/or to achieve formation isolation. In still other cases, cementing may be employed during well abandonment.

The nanocomposites are useful as cement fluid loss additives to prevent cement slurry components from migrating into rock formations after application of the freshly mixed cement and prior to cure. Migration creates formation damage, which later affects oil production. Migration also represents a loss of slurry, which is a considerable expense in both the drilling and cementing operations. Cement operations performed in wellbores under high stress conditions may present particular problems, among other things, difficulty in obtaining good wellbore isolation and/or maintaining mechanical integrity of the wellbore over the life of the well.

For the purposes of this disclosure, the term "dry cement" means a particulate cement prior to addition of water. In embodiments, the nanocomposites are combined with a dry cement, such as Portland cement powder, and a water source to form a cement composition of the invention. During the subsequent curing reaction, the cement compositions of the invention have superior fluid retention properties when compared to conventional cements. This is a significant factor in providing proper cure of the cement, which is reactive with the water to form a strong cured matrix. The cement compositions are also effective at substantially preventing migration of solids into rock formations during cure.

In embodiments, the cement compositions of the invention comprise or consist essentially of water, cement, and a nanocomposite comprising a core-shell morphology wherein the core comprises a nanoparticle having an average particle size of about 10 nm to 500 nm, and the shell comprises a crosslinked polymer comprising acrylamide repeat units.

No special methods are required to form the cement compositions of the invention; components may be suitably added in any order with agitation suitable to form a suitable cement composition for one or more construction purposes as will be recognized by one of skill. In some embodiments, the nanocomposites are employed in w/o latex form, which is added directly to the water source and cement to form a cement composition of the invention. In other embodiments, the nanocomposites latex is spray dried or dried and ground to form a fine powder, and the powder is added to the cement and a water source to form the cement composition of the invention. In still other embodiments, a dispersion of the nanocomposite formed by dispersion polymerization is added to the cement to form a cement composition of the invention; in some such embodiments, the dispersion supplies all the water required to cause the cement to cure; in other embodiments, additional water must be added to facilitate the nanocomposite formation.

The nanocomposites useful in the cement compositions of the invention comprise, consist essentially of, or consist of nanoparticulate cores having crosslinked polymer shells. The nanocomposites are present in the cement compositions of the invention at about 0.5 wt % to 5 wt % of the cement composition, or about 0.7 wt % to 5 wt %, or about 1 wt % to 5 wt %, or about 0.5 wt % to 3.5 wt %, or about 0.5 wt % to 3 wt %, or about 0.5 wt % to 2.5 wt %, or about 0.5 wt % to 2 wt % of the cement composition.

The dry cement is present in the cement compositions of the invention at about 30 wt % to 80 wt % of the composition, or about 40 wt % to 80 wt %, or about 50 wt % to 80 wt %, or about 60 wt % to 80 wt %, or about 50 wt % to 70 wt %, or about 60 wt % to 70 wt % of the cement compositions of the invention.

The nanocomposite source includes a single nanoparticle composition or two or more nanoparticle compositions, as selected by the user in the synthesis as described above. In other embodiments, two or more nanocomposite sources are blended in a single cement, wherein the nanocomposite sources are different.

Drilling Fluid Compositions and Methods.

In embodiments, the nanocomposites are combined with a bridging agent and a water source to form a drilling fluid of the invention. The drilling fluids of the invention have superior fluid retention properties when compared to conventional drilling fluids. The drilling fluids are also effective at substantially preventing migration of solids into rock formations during drilling operations.

In embodiments, the drilling fluids of the invention comprise or consist essentially of water; calcium carbonate; and a nanocomposite comprising a core-shell morphology wherein the core comprises a nanoparticle having an average particle size of about 10 nm to 500 nm, and the shell comprises a crosslinked polymer comprising acrylamide repeat units.

No special methods are required to form the drilling fluids of the invention; components may be suitably added in any order with agitation suitable to form a suitable drilling mud or fluid as will be recognized by one of skill. In some embodiments, the nanocomposites are employed in w/o latex form, which is added directly to the water source and bridging agent to form the drilling fluid. In other embodiments, the nanocomposites latex is spray dried or dried and ground to form a fine powder, and the powder is added to the bridging agent and water source to form the drilling fluid.

The nanocomposites useful in the mud compositions of the invention comprise, consist essentially of, or consist of nanoparticulate cores having crosslinked polymer shells. When added to one or more bridging materials and a water source, the nanoparticulates function as fluid loss control agents in one or more drilling operations. The nanocomposites are present in the drilling fluids of the invention at about 0.5 wt % to 5 wt % of the drilling fluid, or about 0.7 wt % to 5 wt %, or about 1 wt % to 5 wt %, or about 1.3 wt % to 5 wt %, or about 1.5 wt % to 5 wt %, or about 1.7 wt % to 5 wt %, or about 2.0 wt % to 5 wt %, or about 0.5 wt % to 3.5 wt %, or about 0.5 wt % to 3 wt %, or about 0.5 wt % to 2.5 wt %, or about 0.5 wt % to 2 wt %, or about 1 wt % to 4 wt %, or about 1 wt % to 3 wt % of the drilling fluid.

In some embodiments, a nanocomposite source is the product of a single nanocomposite synthesis. In some embodiments, a single nanocomposite source is employed in a drilling fluid. The nanocomposite source has a single particle size distribution or a bimodal or higher modal distribution, as selected by the user in the synthesis as described above. The nanocomposite source includes a single nanoparticle composition or two or more nanoparticle compositions, as selected by the user in the synthesis as described above. In other embodiments, two or more nanocomposite sources are blended in a single drilling fluid, wherein the nanocomposite sources are different. Thus, in various embodiments the user may advantageously select and blend, in any ratio, two or more nanocomposite sources having different nanoparticle size distributions, different nanoparticle compositions, different polymer content, different ratios of polymer to nanoparticulate, or nanocomposite sources having two or more such differences in a single drilling fluid. The ability to control the nanocomposite content of the drilling fluids of the invention with ease is an advantage of the invention, because different reservoirs have different rock porosities, fracture sizes, and pore sizes to address. The ability to select and optionally blend nanocomposite sources with ease means that optimization of drilling fluids to address different particle packing needs in the field is accomplished with ease. The different nanocomposite sources are advantageously blended during a manufacturing or packaging step, or in situ in the field.

The drilling fluids of the invention comprise one or more nanocomposite sources, a water source, and a bridging agent. Bridging agents are particulate solids added to a drilling fluid to bridge across the pore throat or fractures of an exposed rock, thereby building a filter cake to prevent loss of whole mud or excessive filtrate. For reservoir applications, common bridging agents include calcium carbonate, suspended salt, and oil-soluble resins. The particle size of the bridging agent is selected by the user. In some embodiments, selection is based on criteria familiar to those of skill:

particle size of the bridging agent is selected to be approximately one-third of the average pore size of the rock formation being addressed.

The bridging agent is present in the mud compositions of the invention at about 10 wt % to 30 wt % of the composition, or about 10 wt % to 25 wt %, or about 10 wt % to 20 wt %, or about 10 wt % to 15 wt %, or about 11 wt % to 30 wt %, or about 12 wt % to 30 wt %, or about 13 wt % to 30 wt %, or about 14 wt % to 30 wt %, or about 15 wt % to 30 wt %, or about 12 wt % to 20 wt % of the mud compositions of the invention.

Water Conformance and EOR Compositions and Methods.

This application involves the use of polymer gels or other materials to divide, seal or separate the flow in two different sections of a reservoir. The nanocomposites are useful for temporarily blocking a layer or section of the reservoir for the purpose of isolation and reduce the migration of water to the desired target section. More on water conformance and EOR potential applications is found at http://petrowiki.org/Conformance_improvement.

Paper Filler Compositions and Methods.

Combinations of nanocomposites and cationic starch are useful as paper fillers and to prevent migration and settling in waterbased furnishes used for papermaking. Such applications include the use of papermaking processes and equipment for making nonwoven articles such as filter media.

Flocculating Agent and Clarifier Compositions and Methods.

The nanocomposites are useful as flocculation agents and clarifiers in processes such as papermaking and water treatment. In some such embodiments, the nanocomposites include a cationically charged ionic polymer shell.

Methods of Drilling

In embodiments, the drilling fluids of the invention are useful in one or more mud drilling methods. In some embodiments, the drilling methods involve application of the drilling fluid to a wellbore of a hydrocarbon-bearing rock formation, contemporaneously with drilling within the wellbore. The drilling fluids are added to the wellbore to facilitate the drilling process by suspending cuttings, controlling pressure, stabilizing exposed rock, providing buoyancy, and cooling and lubricating. The drilling fluids of the invention do not adsorb to rock formations in the well and therefore do not clog the pores of the rock formation. Fluid loss control is obtained without any observed gelation or caking of the fluid, such as within a wellbore.

The drilling fluids have superior properties of fluid loss control compared to conventional water-base fluid loss additives such as starch. For example, when measured according to API Recommended Procedure 13B-1, the drilling fluids of the invention undergo less than about 10 mL fluid loss at HPHT conditions including temperatures above 100° C., for example 100° C. to 200° C., or about 100° C. to 190° C., or about 100° C. to 180° C., or about 100° C. to 170° C., or about 110° C. to 200° C., or about 120° C. to 200° C., or about 130° C. to 200° C., or about 140° C. to 200° C., or about 150° C. to 200° C., or about 120° C. to 180° C. In such testing, fluid loss of the drilling fluids of the invention is about 1 mL to 10 mL, or about 1 mL to 9 mL, or about 1 mL to 8 mL, or about 1 mL to 7 mL, or about 1 mL to 6 mL, or about 1 mL to 5 mL, or about 2 mL to 10 mL, or about 3 mL to 10 mL, or about 4 mL to 10 mL, or about 5 mL to 10 mL, or about 5 mL to 9 mL, or about 5 mL to 8 mL, or about 5 mL to 7 mL.

In some such tests, the drilling fluids of the invention are heat aged at a temperature of 120° C. to 150° C. for 16 hours or more prior to the fluid loss testing, wherein the fluid loss test results before and after the heat aging (hot rolling) are substantially the same or are lower (representing improved fluid loss performance) after being subjected to heat aging. In other tests, the drilling fluids of the invention are heat aged at a temperature of 150° C. to 170° C. for 16 hours or more prior to the fluid loss testing, wherein the fluid loss test results before and after the heat aging reflect the thermal stabilization provided by the presence of the nanoparticulate. We have found that the presence of the nanoparticle causes the performance of the nanocomposite to be improved in high temperature applications, both before and after heat aging at 150° C. to 170° C. For example, even after 16 hours of heat aging at 163° C., the nanocomposites undergo less than about 10 mL fluid loss at HPHT conditions. Further, the nanocomposites exhibit at least 10% less fluid loss during use than a polymer particulate formed using the same procedures as the nanocomposite but without including a nanoparticle, when the two materials are compared on the same weight basis. In some such embodiments, the fluid loss observed for the nanocomposite is about 10% to 40% less than that of the corresponding polymer particulate (same polymer but without nanoparticulate), or about 15% to 40% less, or about 20% to 40% less, or about 25% to 40% less, or about 30% to 40% less, or about 10% to 35% less, or about 10% to 30% less, or about 15% to 35% less, or about 25% to 35% less, or about 30% to 35% less than that of the corresponding polymer particulate when measurements are taken at 150° C. to 170° C.

In embodiments, a method of the invention comprises applying a drilling fluid of the invention to a wellbore, and carrying out a drilling operation in the wellbore. In some embodiments, the drilling is intermittent, that is, drilling is carried out for periods of time, in between which drilling is stopped. In some embodiments, the temperature within a portion of the wellbore is about 60° C. to 250° C. In some embodiments, the wellbore comprises a water source having high total dissolved solids.

The drilling fluids of the invention are effective to prevent fluid loss in one or more wellbores during drilling. The drilling fluids of the invention prevent fluid loss during intermittent drilling. The drilling fluids of the invention do not undergo substantial gelation or caking within the wellbore during drilling or during intermittent drilling, yet still provides effective fluid loss prevention in and around rock surfaces and fissures or cracks in the rock.

EXPERIMENTAL

Example 1

The components listed in Table 1 were mixed to form water-in-oil emulsions as described in the procedure below.

TABLE 1

Components of a nanocomposite synthesis.

| Component | Composition range, wt % |
|---|---|
| acrylamide | 10-25 |
| 2-acrylamido-2-methylpropane-1-sulfonic acid (AMPSA) | 0-15 |
| ethylene diamine tetraacetate | 0.010-0.03 |
| SPAN ® 80 (Croda International of Yorkshire, GB) | 1.5-2 |
| TWEEN ® 85 (Croda International) | 5-10 |

TABLE 1-continued

Components of a nanocomposite synthesis.

| Component | Composition range, wt % |
|---|---|
| 2,2'-azobisisobutyronitrile | 0.15-0.2 |
| N,N'-methylenebisacrylamide | 0.15-0.2 |
| sodium metabisulfite | 0.1-0.2 |
| nanoparticles, dry wt. | 0.5-5 |
| paraffinic distillate mixture, b.p. 223.6° C. | 30-40 |
| water (deionized) | 40-50 |

The paraffinic distillate and SPAN® and TWEEN® surfactants were added to a vessel and mixed for about 10 min. Then water, acrylamide, and 2-acryloylamino-2-methylpropane-1-sulfonic acid were blended together and this blend was added to the vessel, the combined reagents were mixed at 900 rpm for 10 min. Nitrogen purge was started and the selected nanoparticles were added to the vessel. After 10 min. stirring, the ethylene diamine tetraacetate was added to the vessel. Stirring was continued for an additional 30 min under nitrogen purge. Then 2,2'-azobisisobutyronitrile and N,N'-methylenebisacrylamide were added as solids to the vessel and stirring was continued for about 1 hour. Then the temperature of the vessel contents was increased to 50° C., with subsequent temperature control employed to maintain temperature between 60° C. and 65° C. After 5 hours at 60° C.-65° C., sodium metabisulfite was added to the vessel. The vessel was maintained at 60° C. with stirring for an additional 1 hour. Then the contents of the vessel were allowed to cool to ambient laboratory temperature.

Using this technique, the compositions shown in Table 2 were synthesized. The contents of the vessel were subsequently used as-is for addition to one or more drilling fluid compositions.

TABLE 2

Components of materials used as Fluid Loss Control agents. "Wt % of dry" means the weight percent of dry nanoparticles plus monomer(s) or polymer.

| Agent No. | Nanoparticle type | Nanoparticle, wt % of dry | Acrylamide, wt % of dry | AMPSA, wt % of dry | Bisacrylamide, wt % of dry |
|---|---|---|---|---|---|
| FLC1 | $SiO_2$, 16 nm, surface modified (Evonik, Aerosil R972) | 5.00 | 94.82 | 0 | 0.18 |
| FLC2 | $SiO_2$, 16 nm, surface modified (Evonik, Aerosil R972) | 4.8 | 80.82 | 14.2 | 0.18 |
| C1 | None | 0 | 98.80 | 0 | 0.2 |
| C2 | None | 0 | 84.9 | 14.9 | 0.2 |
| FLC3 | $SiO_2$, 330 µm (SIPERNAT® 2200, Evonik Industries) | 5.0 | 94.82 | 0 | 0.18 |
| FLC4 | $SiO_2$, 16 nm, surface modified (Evonik, Aerosil R972) | 5.2 | 64.82 | 29.8 | 0.18 |
| FLC5 | $SiO_2$, 12 nm (Evonik, Aerosil 90) | 5.0 | 94.82 | 0 | 0.18 |
| FLC6 | $TiO_2$, 21 nm (Sigma Aldrich) | 5.0 | 94.82 | 0 | 0.18 |

Example 2

Table 3 shows components of a drilling fluid of the invention. The components were mixed in the indicated order, with mixing for the indicated amount of time prior to addition of the next component in the list.

TABLE 3

Components of a drilling fluid. Fluid loss control agents (FLC) are indicated in Table 4.

| Component | Wt, g | Mix time, min. |
|---|---|---|
| Tap Water | 350.0 | N/A |
| KCl | 18.0 | 1 |
| NaCl | 3.0 | 1 |
| Sodium Thiosulfate | 1.5 | 3 |
| Torq Free HD (Nalco Champion of Houston, TX) | 12.0 | 2 |
| Xanthan gum (CP Kelco of Atlanta, GA) | 1.8 | 20 |
| Fluid Loss Control agent, wt % of dry additive components | 2.0 | 10 |
| Product 6216 (Nalco Champion) | 12.0 | 2 |
| Sodium Hydroxide or Lime | 0.3-0.6 | 5 |
| Bactron K87 (Nalco Champion) | 0.3 | 1 |
| Calcium carbonate | 15.0 | 5 |
| Barite (API grade) | 213.0 | 10 |

Table 4 shows the drilling fluid compositions formed using the components of Table 3 and incorporating the nanocomposites of Table 2.

TABLE 4

Drilling fluids according to the formulation of Table 3, incorporating the Fluid Loss Control (FLC) additives of Table 2.

| Drilling Fluid | Fluid Loss Control agent |
|---|---|
| DF 1 | FLC1 |
| DF 2 | FLC2 |
| DF 3 | FLC3 |
| DF 4 | FLC4 |
| DF 5 | FLC5 |
| DF 6 | FLC6 |
| DF C1 | None |

TABLE 4-continued

Drilling fluids according to the formulation of Table 3, incorporating the Fluid Loss Control (FLC) additives of Table 2.

| Drilling Fluid | Fluid Loss Control agent |
|---|---|
| DF C2 | C1 |
| DF C3 | C2 |
| DF C4 | Starch |

Example 3

Figure 1:
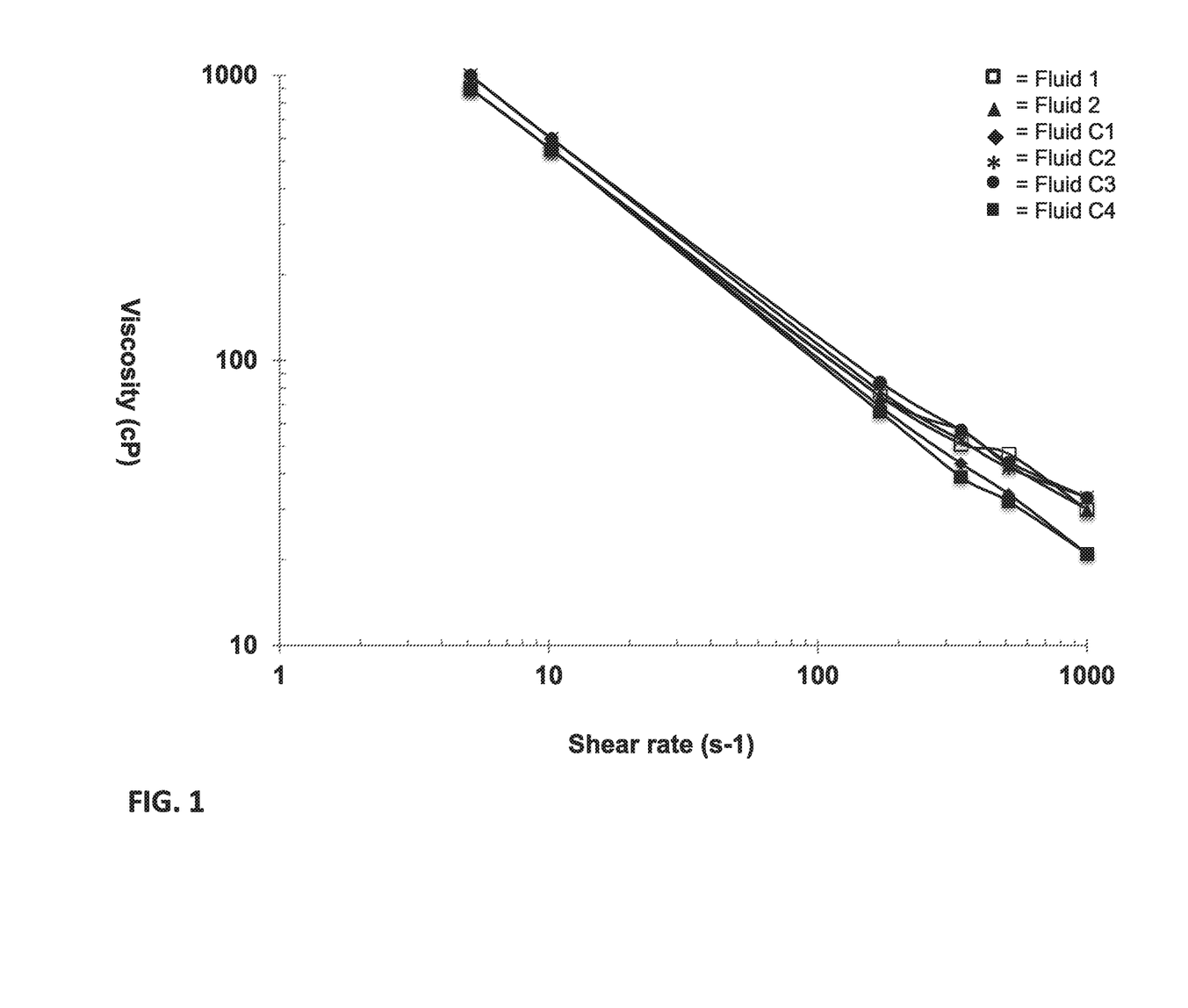
FIG. 1 is a plot showing viscosity as a function of shear rate for drilling fluids of the invention.

Viscosity as a function of shear rate for Fluid C1, Fluid C2, Fluid C3, Fluid C4, Fluid 1, and Fluid 2 was measured using a FANN® 35 Viscometer (obtained from FANN® Instrument Company of Houston, Tex.) at 150° F.; shear rate was varied from 10 to 1000 s$^{-1}$. FIG. 1 is a plot of viscosity (cP) as a function of shear rate for the indicated fluids.

FIG. 1 shows that the rheology of the drilling fluid was not substantially changed by the presence of the fluid loss control agents. When Fluid 1 and Fluid 2 are compared to a drilling fluid having no fluid loss control agent (Fluid C1) or to starch as a fluid loss control agent (Fluid C4), it is observed that the nanocomposites do not increase viscosity substantially. Thus, the nanocomposites are characterized by the absence of substantial swelling in the drilling fluids of the invention: if the polymer component of the nanocomposites were to swell substantially in the presence of water, the viscosity of the drilling fluid would be expected to increase—in particular over the viscosity of the fluid having no fluid loss control agent. In some cases, excessive swelling leads to gelation within a wellbore, which is undesirable for use with drilling equipment. However, it is necessary for the nanocomposites to swell sufficiently to prevent fluid loss. Fluid loss is measured in Example 4.

Example 4

Fluid loss control performance of fluid loss control agents were measured in accordance with conditions expected in high temperature/high pressure (HTHP) drilling operations. A portion of each of the fluids was placed in high pressure cells (OFITE cells) and rolled for 16 hours at 149° C. to simulate fluid aging conditions at high temperature. Then the aged and unaged fluids were subjected to the Fluid Loss Test as described below. Fluid loss results are shown in Table 5.

Fluid Loss Test:

This test was conducted according to API (American Petroleum Institute) procedures for HTHP filtration, which is a measure of fluid loss from muds under HTHP conditions (Recommended Practices 13B-1 and 13B-2). According to the procedure, an HTHP jacket should be preheated to 10° F. (5.6° C.) above the test temperature. When the jacket reaches temperature, the test cell is placed in the jacket, the top and bottom pressure connections are made, and the pressurized test cell is allowed to heat. When the cell temperature is within 5° F. (2.8° C.) of the test temperature, the top and bottom pressure is adjusted to the selected value, and the HTHP test begins. API recommendations are that the test cell and fluid should reach test temperature within one hour. The volume of fluid is collected as a function of time for 30 min. (1, 3, 5, 10, 15, 20, 25 and 30 min readings).

In the present disclosure, the test was conducted at 148.9° C. unless specified otherwise, and the following procedure was used with this test temperature:

The HTHP jacket is preheated to 154.5° C. The test fluid is mixed for 10 minutes before adding to the test cell. The test cell holds approximately 175 mL of a sample in the top portion of the cell. A thermocouple is placed into the top portion of the test cell, threaded through the top port, and sealed. Top and bottom pressure regulators are connected. Nitrogen gas is applied through the top valve at 690 kPa. The pressurized test cell and fluid are allowed to heat for 60 minutes, wherein at the end of 30 minutes, the pressure on the top regulator is increased to 4,140 kPa and the bottom receiver pressure is adjusted to 690 kPa, resulting in a 3447 kPa differential pressure across the filter paper (Filter paper #206056, obtained from Fann Instrument Company of Houston, Tex.). Then bottom test cell valve is opened to start the test. After 30 minutes, the bottom valve is closed to end the test. Filtrate volume is measured and recorded.

TABLE 5

Fluid loss after 30 min., before and after 16 hours of hot-roll aging at 149° C. for the indicated fluids.

| | Fluid Loss, mL, 30 min. @ 149° C. | |
|---|---|---|
| Drilling Fluid | Before hot rolling | After hot rolling |
| DF C1 | >100 | >100 |
| DF C2 | 6.5 | 6.4 |
| DF C4 | 19.3 | >100 |
| DF 1 | 6.3 | 6.4 |
| DF 3 | 11.1 | 7.9 |
| DF 4 | 6.3 | 6.0 |
| DF 5 | 10.3 | 6.8 |
| DF 6 | 9.2 | 6.2 |

Example 5

Figure 2:
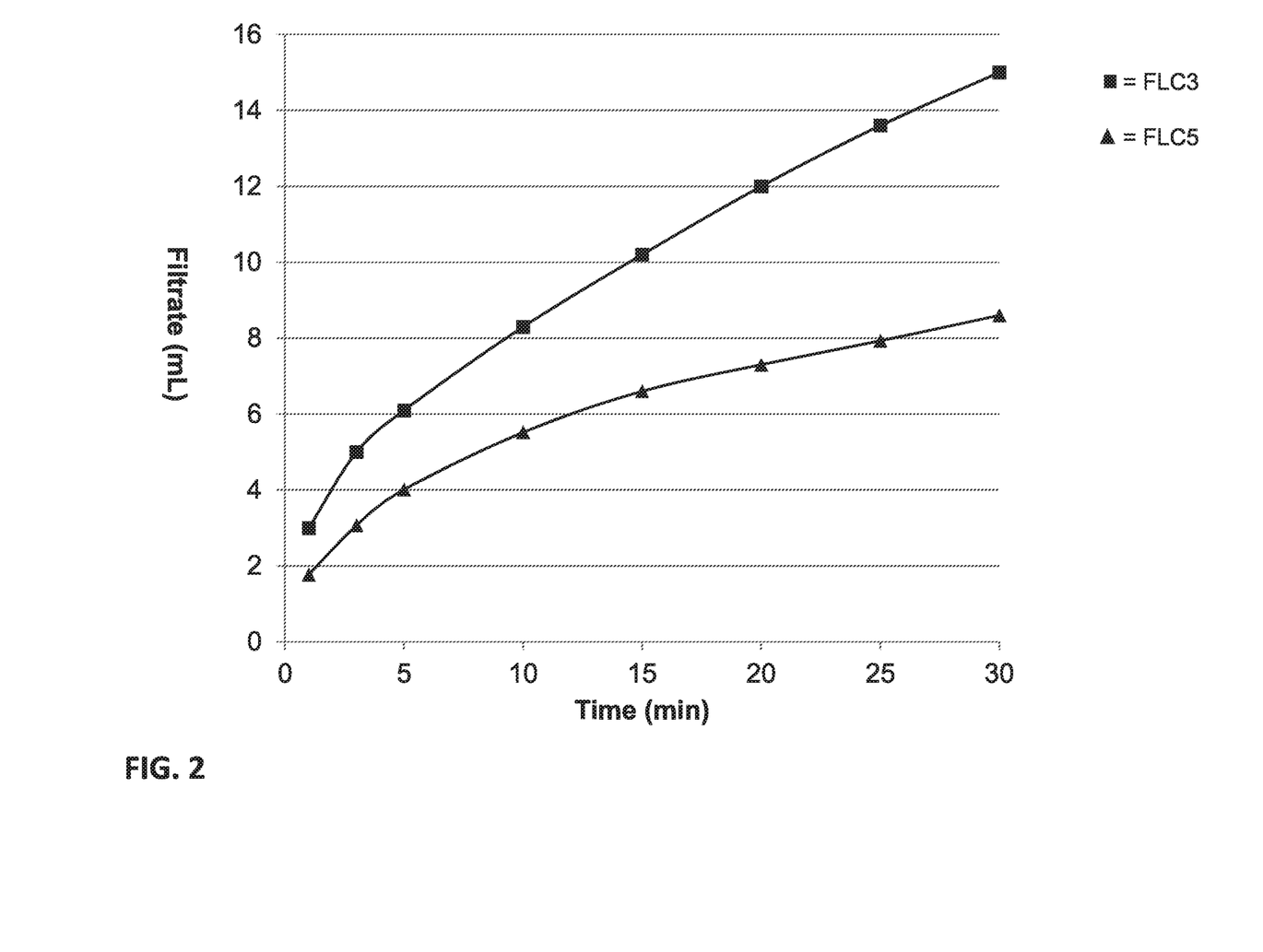
FIG. 2 is a plot showing fluid loss after heat aging at 121.1° C. as a function of time for drilling fluids of the invention, measured according to API Recommended Procedure 13B-1.
Figure 3:
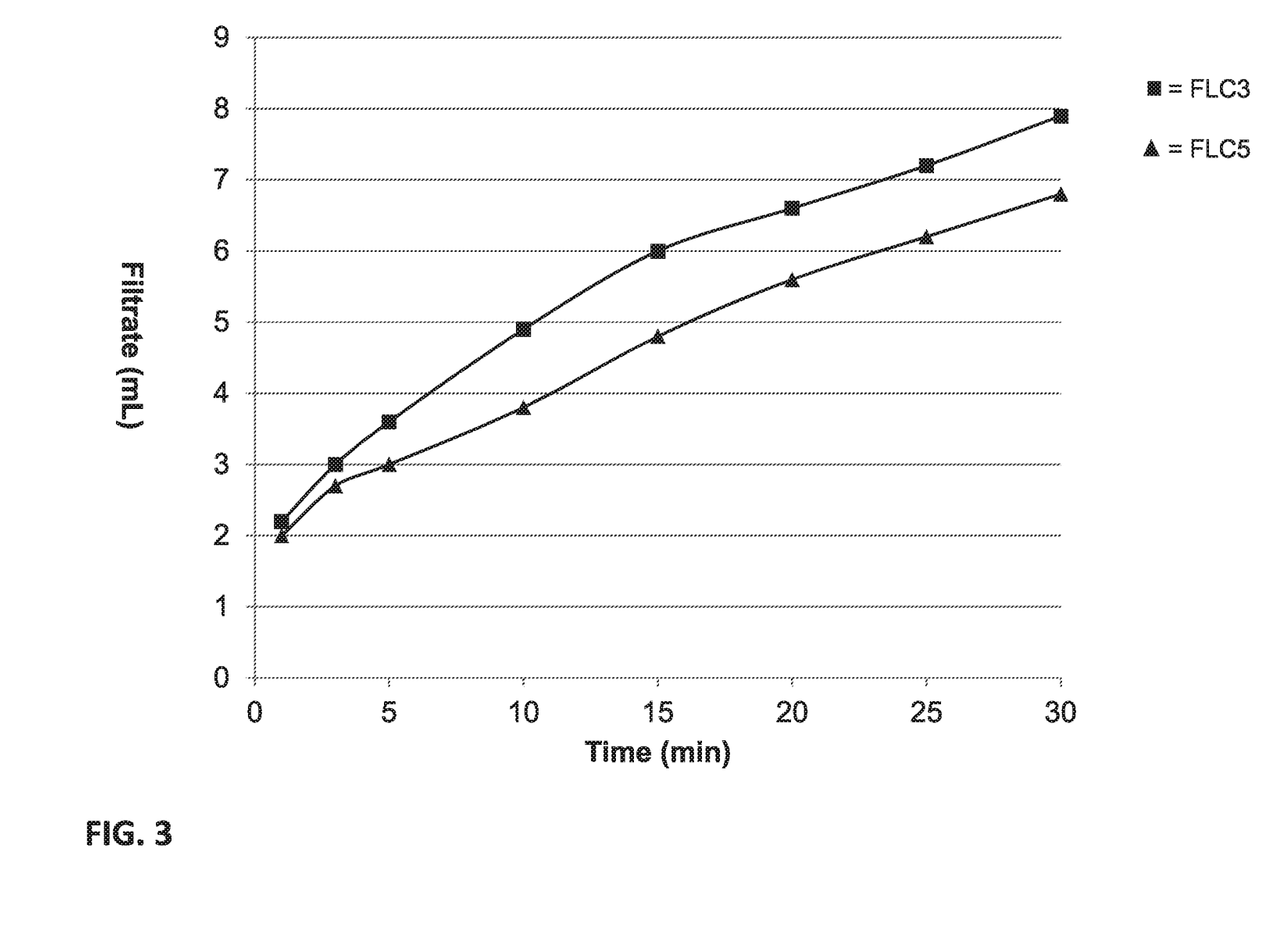
FIG. 3 is a plot showing fluid loss after heat aging at 148.9° C. as a function of time for drilling fluids of the invention, measured according to API Recommended Procedure 13B-1.

Fluid loss properties were compared for nanocomposites including silica nanoparticles of varying particle size. Thus, FLC 3 and FLC 5 were compared in fluid loss testing at 121.1° C. and 148.9° C. using the procedure of Example 4. The FLC materials were tested at 0.57 wt % and 1.14 wt % in drilling fluids having the same components as shown in Table 3. FIG. 2 is a plot of fluid loss as filtrate as a function of time after 16 hours of hot roll aging at 121.1° C. for the indicated Fluid loss control agents at 0.57 wt %. FIG. 3 is a plot of fluid loss as filtrate, as a function of time after 16 hours of hot roll aging at 148.9° C. for the indicated Fluid loss control agents at 1.14 wt %.

Example 6

Figure 4:
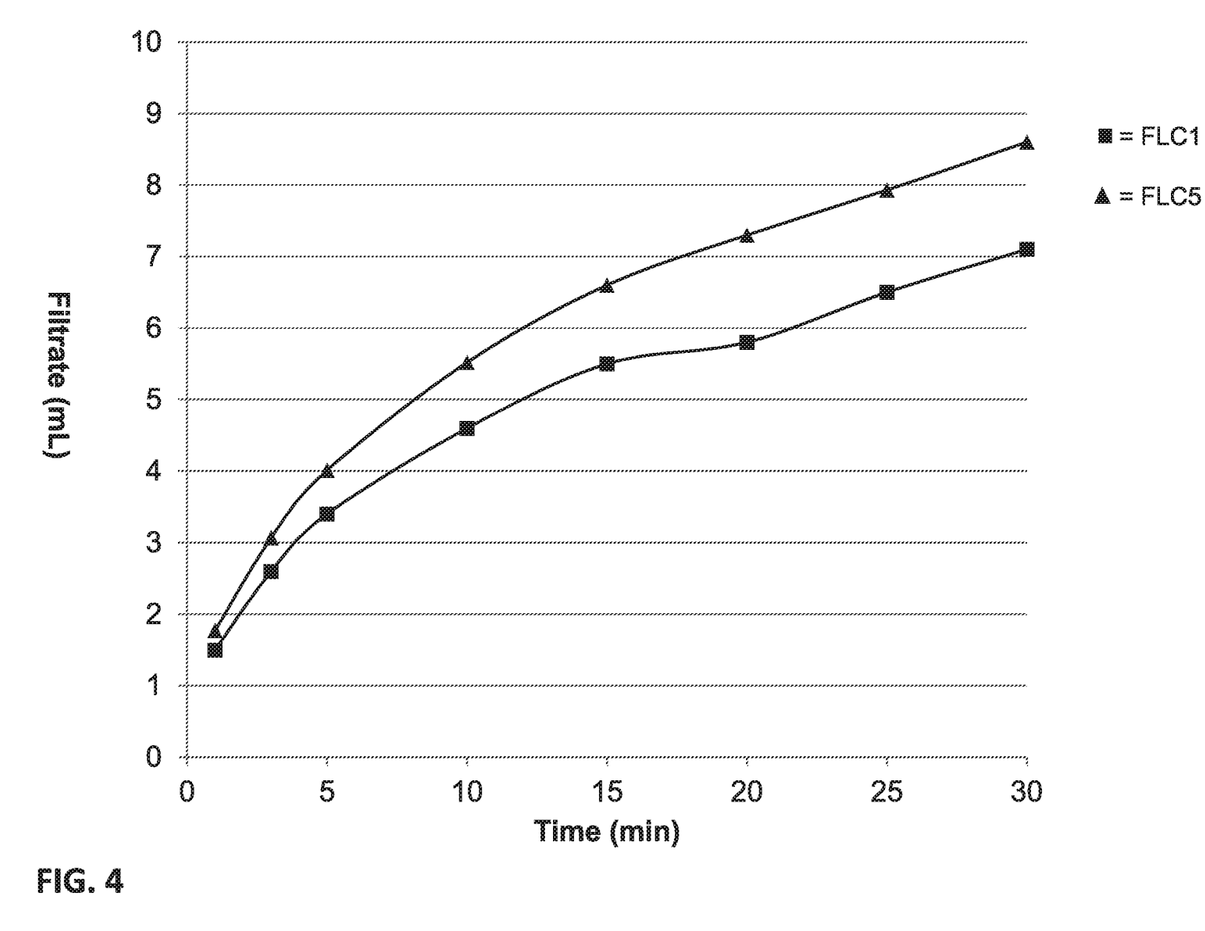
FIG. 4 is a plot showing fluid loss after heat aging at 121.1° C. as a function of time for drilling fluids of the invention, measured according to API Recommended Procedure 13B-1.
Figure 5:
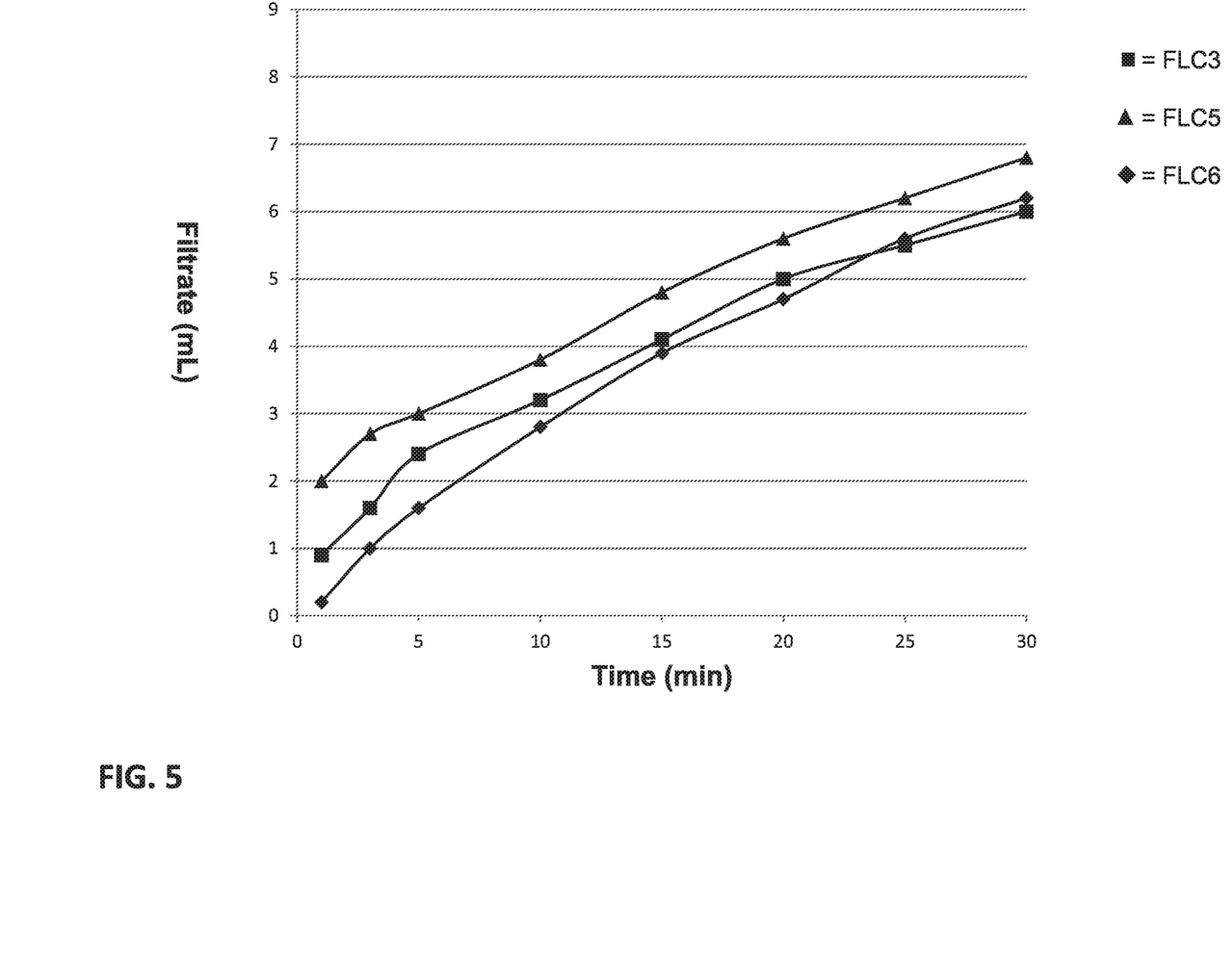
FIG. 5 is a plot showing fluid loss after heat aging at 148.9° C. as a function of time for drilling fluids of the invention, measured according to API Recommended Procedure 13B-1.

Fluid loss properties were compared for nanocomposites having various compositions. Thus, FLC1, FLC5, and FLC6 were compared in fluid loss testing at 121.1° C. and 148.9° C. using the procedure of Example 4. The FLC materials were tested at 0.57 wt % and 1.14 wt % in drilling fluids having the same components as shown in Table 3. FIG. 4 is a plot of fluid loss as filtrate as a function of time after 16 hours of hot roll aging at 121.1° C. for the indicated Fluid loss control agents at 0.57 wt %. FIG. 5 is a plot of fluid loss as filtrate, as a function of time after 16 hours of hot roll aging at 148.9° C. for the indicated Fluid loss control agents at 1.14 wt %.

Example 7

High temperature stability and fluid loss properties were compared for nanocomposites vs. polymer particles formed without including a nanoparticle. Thus, FLC2 and C2 (see Table 2) were compared in fluid loss testing using the procedure of Example 4, except that the test was carried out at 163° C. The fluids tested included 1.14 wt % of FLC2 or C2 solids in a drilling fluid having the same components as shown in Table 3. The fluids were tested both before and after hot rolling at 163° C. for 16 hours. Fluid loss results are shown in Table 6.

TABLE 6

Fluid loss after 30 min., before and after 16 hours of hot-roll aging at 163° C. for the indicated fluids.

| Drilling Fluid | Fluid Loss, mL, 30 min. @ 163° C. | |
| --- | --- | --- |
| | Before hot rolling | After hot rolling |
| DF 2 | 5.8 | 6.4 |
| DF C3 | 6.7 | 8.5 |

It can be seen from the foregoing that the presence of the nanoparticulate has a substantial beneficial effect in maintaining the performance of the nanocomposite in high temperature applications. Before hot rolling, DF C3, which includes fluid loss control agent C2 exhibited greater than 15% more fluid loss than DF 2, which includes fluid loss control agent FLC2. After hot rolling for 16 hours, DF C3 exhibited more than 30% greater fluid loss than DF 2.

Example 8

Particle size was measured for the fluid loss control agents listed in Table 7. Particle size was measured using dynamic light scattering with a Horiba SZ-100 Nanoparticle analyzer (obtained from Horiba Ltd. of Kyoto, Japan). Latex samples were added directly to the quartz cells, and measurements were performed at room temperature and in triplicate.

TABLE 7

Particle size analysis of the fluid loss control agents listed.

| Fluid Loss Control Agent | Agent Particle Size (nm) | Avg (nm) | Std Dev |
| --- | --- | --- | --- |
| C1 | 177.5 | 182.4 | 4.3 |
| | 185.6 | | |
| | 184 | | |
| FLC1 | 158.5 | 161.4 | 5.1 |
| | 158.5 | | |
| | 167.3 | | |
| C2 | 74.1 | 76.4 | 2.0 |
| | 77.6 | | |
| | 77.5 | | |
| FLC2 | 63.1 | 61.4 | 4.3 |
| | 56.6 | | |
| | 64.6 | | |

The particle size of FLC 1 is about 1000% of the size of the nanoparticle used in the synthesis of FLC1 (16 nm $SiO_2$). However, the particle size of the FLC1 is about 12% less than the particle size of C1. The particle size of FLC2 is about 380% of the size of the nanoparticle used in the synthesis of FLC2. However, the particle size of FLC2 is about 20% less than the particle size of C2.

Example 9

Thermogravimetric analysis was conducted for fluid loss control agents listed in Table 8. To obtain a sample for the analysis, portions of the latices formed according to the procedure of Example 1 were precipitated under agitation in at least a 5-fold excess of methanol, followed by centrifugation for 15 minutes. The liquid upper layer was discarded and the precipitate was washed again with methanol and re-centrifuged. This procedure was repeated three times. Then, the precipitate was dried in a vacuum oven at 60° C. for 24 hours. Thermogravimetric curves were obtained for the dry samples in a Q500 thermogravimetric analyzer (obtained from TA Instruments of New Castle, Del.) under a high resolution sensitivity ramp of 10° C./min from ambient laboratory temperature to 600° C., under nitrogen purge.

TABLE 8

Total thermogravimetric weight loss for the indicated fluid loss control agents.

| Fluid Loss Control Agent | Weight loss (%) | | |
| --- | --- | --- | --- |
| | 200° C. | 300° C. | 350° C. |
| FLC1 | −12.5 | −23 | −30 |
| FLC2 | −19 | −28 | −52 |
| C1 | −11.9 | −26 | −68 |
| C2 | −17.5 | −23 | −43 |

Example 10

To test fluid loss control of the nanocomposites in cement during cure, a Waring blender was charged with 228 g tap water and a sufficient amount of either FLC 3 or FLC 5 to provide 1 wt % nanocomposite content after addition of cement. The blender was turned on and adjusted to about 4000 rpm. Then 600 g Joppa class H Portland cement was added to the blender over about 15 seconds. Stirring was continued for about 15 seconds after the addition was completed; then the speed of mixing was increased to 12,000 rpm and stirring was maintained for an additional about 35 seconds.

Fluid loss of the cement composition thus formed was determined using an OFITE HPHT Filter Press (obtained from OFI Testing Equipment, Inc. of Houston, Tex.) employing the procedure outlined for use by the manufacturer, pressure differential of 1000 psi using $N_2$, temperature of 93° C., and 325 mesh screen (44 μm). Fluid loss was compared for the FLC 3 and FLC 5 nanocomposites and a control (no fluid loss control additive) after 30 minutes of pressurization. The results are shown in Table 9.

TABLE 9

Fluid loss of freshly mixed cement with and without nanocomposites after 30 minutes at 93° C., 1000 psi.

| Nanocomposite | Fluid loss, mL |
| --- | --- |
| FLC 3 | 31 |
| FLC 5 | 37 |
| none | 148 |

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

We claim:

1. A drilling fluid comprising:
   a water source;
   a bridging agent; and
   a fluid loss additive comprising a nanocomposite, the nanocomposite comprising a core-shell wherein the core-shell comprises a core and a shell, wherein the core comprises an inorganic nanoparticle having an average particle size of about 5 nm to 500 nm and wherein the inorganic nanoparticle is selected from silica, treated or partially treated fumed silica, colloidal silica, or silica-alumina composite particles, or titania and the shell comprises a crosslinked polymer comprising acrylamide repeat units, acrylic acid repeat units or a salt thereof, 2-acryloylamino-2-methylpropane-1-sulfonic acid repeat units or a salt thereof, or a combination thereof, wherein the crosslinking polymer is from about 0.1 wt % to 1 wt %,
   wherein fluid loss of the drilling fluid is less than the fluid loss with only the shell.

2. The drilling fluid of claim 1 wherein the bridging agent is calcium carbonate.

3. The drilling fluid of claim 1 wherein the nanoparticle comprises silica or titania.

4. The drilling fluid of claim 3 wherein the nanoparticle is hydrophobically modified.

5. The drilling fluid of claim 1 wherein the crosslinked polymer comprises an N,N'-methylenebisacrylamide crosslinker.

6. The drilling fluid of claim 1 wherein the weight ratio of nanoparticle to polymer is about 1:100 to 50:50.

7. The drilling fluid of claim 1 wherein the nanocomposite is present at about 0.5 wt % to 5 wt % of the fluid weight.

8. The drilling fluid of claim 1 wherein the nanocomposite comprises two or more nanocomposite sources.

9. The drilling fluid of claim 1 wherein the nanocomposite comprises two or more nanoparticle sources.

10. The drilling fluid of claim 1 wherein the nanocomposite is thermally stable up to 250° C.

11. The drilling fluid of claim 1 wherein the nanocomposite does not gel.

12. The drilling fluid of claim 1 wherein the fluid loss of the drilling fluid is less than about 10 mL at 149° C.

13. The drilling fluid of claim 1 wherein the nanocomposite is in a water in oil latex form.

* * * * *